UNITED STATES PATENT OFFICE.

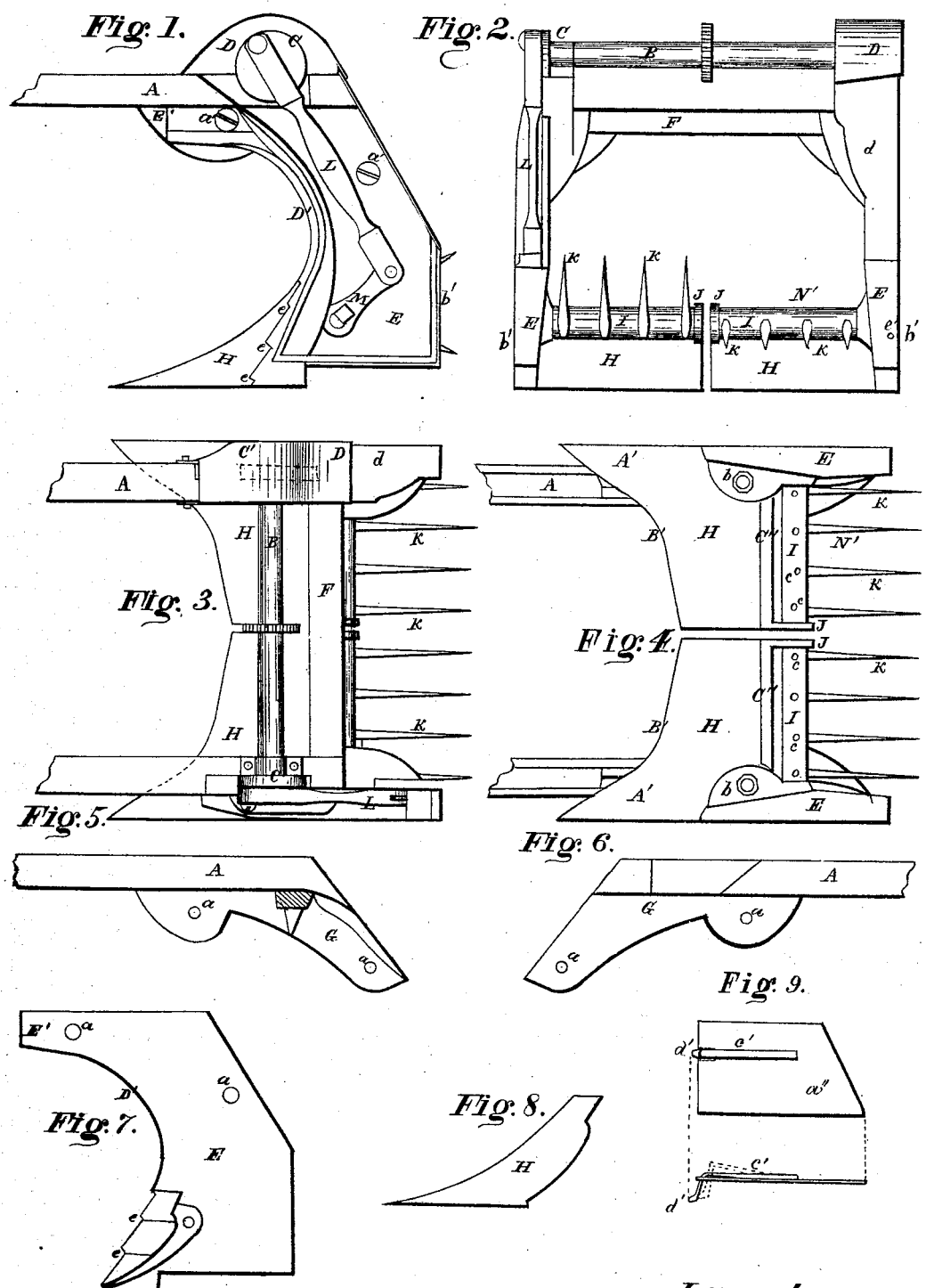

DAVID M. KING, OF MANTUA STATION, OHIO.

IMPROVEMENT IN POTATO-DIGGERS.

Specification forming part of Letters Patent No. 149,043, dated March 31, 1874; application filed December 17, 1873.

*To all whom it may concern:*

Be it known that I, DAVID M. KING, of Mantua Station, in the county of Portage and State of Ohio, have invented a certain new and Improved Potato-Digger, of which the following is a full and complete description, reference being had to the accompanying drawings making part of this specification.

Figure 1 is a side view of a detached section of the machine containing the improvements. Fig. 2 is an end view of the same. Fig. 3 is a plan view. Fig. 4 is an under-side view of Figs. 1, 2, and 3. Figs. 5, 6, 7, 8, and 9 are detached sections, to which reference will be made.

Like letters of reference refer to like parts in the several views.

The nature of this invention relates to a potato-digger; and consists in several improvements, simplifying the construction and rendering more durable and simple in operation a former machine for digging potatoes, for which a patent was granted to myself and George E. King, April 15, 1873. Of the nature of the improvements and of their respective advantages and operation the following is a description:

The power is applied through a pair of driving-wheels, supporting the frame of the machine, together with the necessary gearing, whereby the digging mechanism is operated. (Not shown in the drawing, it being simply a modification of that in the patent of which this is an improvement.)

In the several drawings, A represents the rear part of the frame of the machine. B is a shaft, having on each end a crank-wheel, C C', inclosed in case D, and, therefore, not seen at both ends, except in dotted lines. To the frame are connected hollow standards E E', Fig. 2, a detached view of one of which is shown in Fig. 7. Said standards are connected to each other and braced by a beam, F, forming a part of the frame A. The attachment of the standards to the frame is made by means of wide projecting flanges or offsets G, Fig. 6, to which the standards are fitted, and secured by bolts $a'$, inserted in the holes $a$, as shown in Fig. 1. H H are shovels or shares fitted to and secured to the standards by bolts $b$, Fig. 4. Said shovels are intended to enter the ground beneath the potatoes, lift the dirt with the potatoes therein, and allow them to pass over their edges and upon the prongs of the sifters. The sifters referred to consist each of a shaft or head, I, Fig. 4, having one of its bearings in the hollow standard, and its inner bearing in an ear, J, cast on the shovel, and forming a part thereof. K are the teeth or prongs of the sifters, and are inserted in the shafts I, and secured therein by pins $c$, Fig. 4, one half of the pin being in the prong, and the other half in the shaft I. The sifters are vibrated by the crank-wheels C C', to which each one is respectively connected by a pitman, L, and arm M, as shown in Fig. 1. The pitman and arm connecting with the sifter N' are encircled in the case D, and hence are not seen. I give to the cutting-edges of the shovels B' a curving line, as shown in Fig. 4, which will cause them to work into the ground with ease; and the shovels are easily attached to the standards, as will be seen on examination of Figs. 7 and 8. In the front edge of the standards are made notches or shoulders $e$, Fig. 7, to which the shovel, Fig. 8, is fitted, there being on its opposite side notches or shoulders corresponding to those shown on the standards, the two fitting to each other, as shown in Fig. 1, and thus secured by a bolt, $b$, Fig. 4.

In this machine I make a direct connection of the sifters with the vibrating-crank C by a pinion, L, as shown in Fig. 1. In thus making a direct connection of the sifters to the cranks, I am enabled to set the rear part of the machine near to the train of driving-gears, thereby diminishing the entire length of the machine.

Access is had to the inside of the case D, inclosing the standards, for oiling and other needful purposes, by means of a door, $a''$, Fig. 9. Said door is fitted in the lower end of the standard at $b'$, Figs. 1 and 2. $c'$ is a spring-catch, which, on shutting the door, is forced back, as indicated by the dotted lines in Fig. 9, which, when the door is closed, again springs forward, so that the point $d'$ enters the hole $e'$, Fig. 2, in the edge of the case, thereby locking the door.

What I claim as my invention, and desire to secure by Letters Patent, is—

1. The combination of the shovels H H, consisting of one entire piece each, and having a curved cutting-edge, B, standards E E', having curved front edges D', and sifters N N, substantially as and for the purpose set forth.

2. The standards E E', constructed with curved edges D' D' and projecting ends E', extending forward of the axial line of the crank-shaft B, in combination with the frame A and crank-shaft and offsets G, substantially as and for the purpose set forth.

DAVID M. KING.

Witnesses:
J. H. BURRIDGE,
A. F. CORNELL.